United States Patent [19]
Hashemi

[11] Patent Number: 5,574,865
[45] Date of Patent: Nov. 12, 1996

[54] SYSTEM FOR DATA TRANSFER PROTECTION DURING MODULE CONNECTION/DISCONNECTION ONTO LIVE BUS

[75] Inventor: Seyed H. Hashemi, Mission Viejo, Calif.

[73] Assignee: Unisys Corporation, Blue Bell, Pa.

[21] Appl. No.: 348,653

[22] Filed: Dec. 1, 1994

[51] Int. Cl.$^6$ .................................................. G06F 11/08
[52] U.S. Cl. ............ 395/283; 395/185.01; 395/200.02; 395/200.1
[58] Field of Search ............................ 395/200.02, 200.1, 395/828, 281, 285, 308, 309, 402, 410, 181, 182.04, 183.01, 200.05, 827, 841, 283, 284, 290, 309, 182.02, 182.03, 185.01; 326/9, 10, 30, 90

[56] References Cited

U.S. PATENT DOCUMENTS

| | | | |
|---|---|---|---|
| 4,030,075 | 6/1977 | Barlow | 395/302 |
| 4,654,857 | 3/1987 | Samson et al. | 395/182.03 |
| 5,060,139 | 10/1991 | Theus | 395/303 |
| 5,122,691 | 6/1992 | Balakrishnan | 326/86 |
| 5,132,564 | 7/1992 | Fletcher et al. | 326/30 |
| 5,220,211 | 6/1993 | Christopher et al. | 326/90 |
| 5,248,905 | 9/1993 | Kuo | 327/203 |
| 5,277,615 | 1/1994 | Hastings et al. | 439/377 |
| 5,317,697 | 5/1994 | Husak et al. | 395/283 |
| 5,361,267 | 11/1994 | Godiwala et al. | 371/40.1 |
| 5,384,492 | 1/1995 | Carlson et al. | 307/147 |
| 5,396,596 | 3/1995 | Hashemi et al. | 395/250 |
| 5,434,752 | 7/1995 | Huth et al. | 361/798 |
| 5,452,420 | 9/1995 | Engdahl et al. | 395/285 |
| 5,459,840 | 10/1995 | Isfeld et al. | 395/309 |
| 5,471,586 | 11/1995 | Sefidvash et al. | 395/284 |

*Primary Examiner*—Alyssa H. Bowler
*Assistant Examiner*—Dhiren R. Odedra
*Attorney, Agent, or Firm*—Alfred W. Kozak; Mark T. Starr; Steven R. Petersen

[57] ABSTRACT

A plurality of digital modules on a Futurebus Plus common system bus means in a network are connected by the Futurebus Plus system bus for transfer of data between modules. A sending module (master) transmits address and message data on the bus to a receiving module (slave). Each module provides an interface having a Longitudinal Redundancy Checker such that the sending module transmits a first check word to the receiving module which generates a second check-word. If these check words match, then the data is accepted as good. Thus, the network can work continuously using the system bus even while new digital modules are inserted onto the system bus or detached from the system bus.

6 Claims, 3 Drawing Sheets

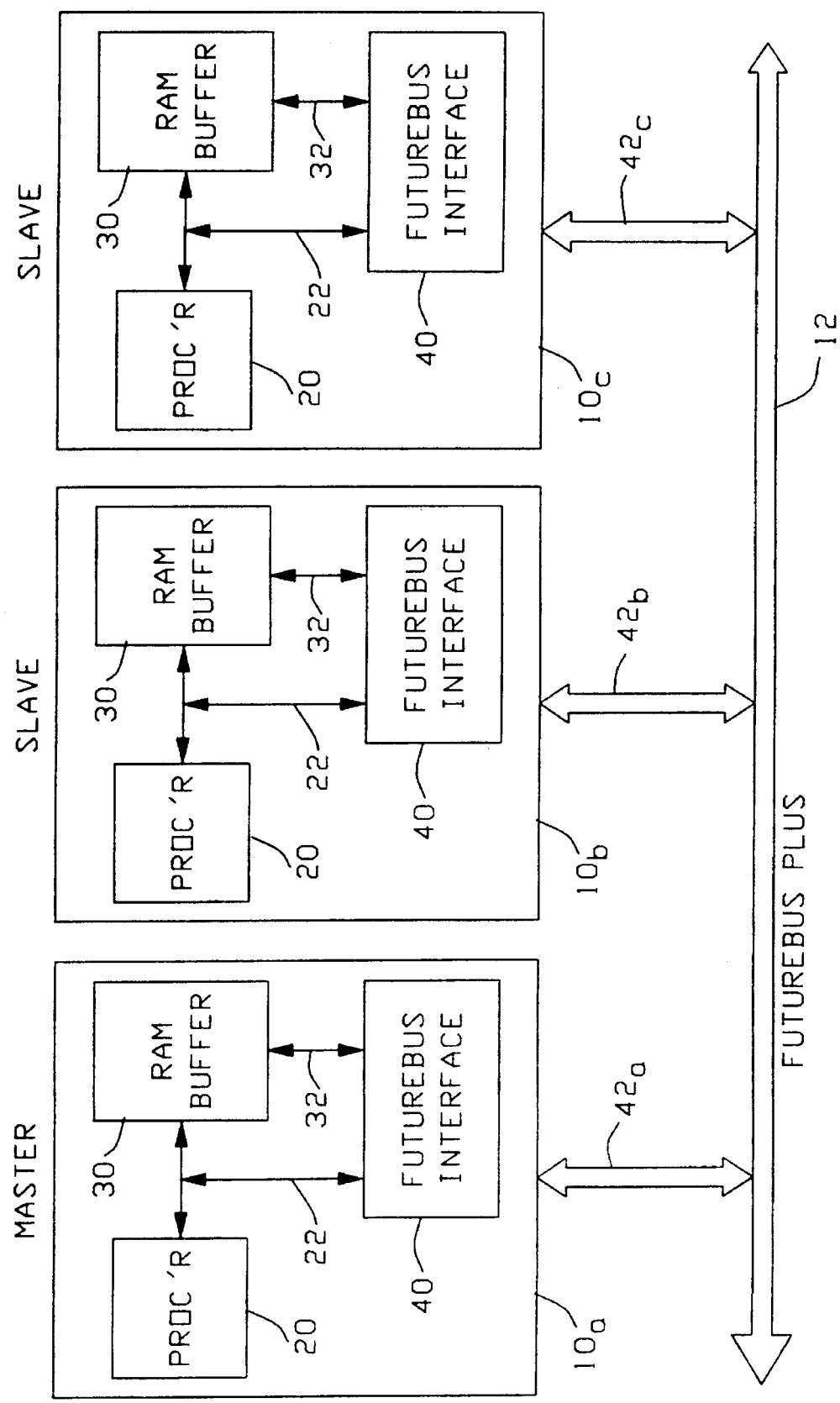

SYSTEM FOR DATA TRANSFER PROTECTION DURING MODULE CONNECTION/DISCONNECTION ONTO LIVE BUS

FIELD OF THE INVENTION

This disclosure pertains to the protection of data being transferred on a internetwork bus which is alive while modules are being connected to or disconnected from the bus.

BACKGROUND OF THE INVENTION

A term that is often used in digital technology is "hot insertion/hot withdrawal". This means that a component module working with a bus such as a Futurebus, is inserted or removed without powering off the entire system. Another often used terminology is "live insertion/withdrawal". This means that a component module of the bus is inserted or removed while other components of the bus are still making use of the bus. This occurs while the bus is still "alive" and used for transferring data.

Sometimes the concept of "hot insertion/withdrawal" is misunderstood. During the condition of a "hot insertion or withdrawal", all components of the bus will stop using the bus. However, they will continue to use the bus only "after" the process of insertion or withdrawal is completed.

However, while a "live insertion or withdrawal" is in process, other component modules on the bus will ignore the action and will continue as if nothing happened. Thus, the "live insertion/withdrawal" is a much more flexible system since operations continue as if nothing is happening to the bus. In this case, however, the probability of an electrical surge with glitches on the bus is extremely high and with it there is great probability that data corruption will occur.

In standard busses that support hot insertion/withdrawal or support live insertion withdrawal, it is up to the user to make sure that the system is protected against such problems of data corruption.

A typical method for protection of the data is an error checking system called LRC, longitudinal redundancy checking.

The longitudinal redundancy check (LRC) is a procedure used to check the accuracy of data transmitted over a communications link. LRC adds a calculated value to a block of data representing a transmitted message. The "calculated value" is based on the data in the message and is calculated both "before" the transmission and "after" the transmission. If the "before" and "after" values match, then the transmission is assumed to be accurate. If the values do not match, then a re-transmission is usually requested. The "calculated value" is often designated as CRC or cyclic redundancy code.

In some busses, for example the "Futurebus Plus", the address and the data are not only separated but occur in different phases of the data transfer operations. Further, in the Futurebus "Plus" network, use is made up of master and slave modules and in this case on the Futurebus Plus, the slave module does not know the amount of data that it is receiving or that it is in the condition of transmitting data. Hence, there is a potential for corruption of data in the slave module memory during conditions of "live insertion/withdrawal".

The present system uses the Futurebus Plus protocol and bus lines as specified in IEEE Specification 896.1 and it is targeted to handle the often occurring problem of data corruption which can occur during module insertion/withdrawal on the "Futurebus Plus" system bus, and in the slave modules holding slave memory units. The description and solution herein is specific to the Futurebus Plus but with minor modification can be extended to handle other busses which have these similar type of problems.

SUMMARY OF THE INVENTION

The problem of data corruption can often occur between master (sending) modules and slave (receiving) modules connected to a common system bus which is alive with data transfers and operating at the time that a digital module is being connected to or disconnected from the common system bus.

The present corruption-protective system provides an interface, (Futurebus interface) in each master or slave module, which develops a Longitudinal Redundancy Checking Value (LRC) on the data read from or written to an internal memory buffer. This LRC value can then be compared to the LRC value of the data sent by a master module or compared to the LRC value of the data received by a slave module. Thus, if no match occurs in the LRC value of the sender compared to the LRC value of the receiver, then an "error" status signal is sent to the sending module.

BRIEF DESCRIPTION OF THE DRAWINGS

FIG. 3 is a system network diagram showing how various digital modules can be connected to or disconnected from the Futurebus Plus in a network.

GENERAL OVERVIEW

A general problem arises with multiple digital modules using a common system bus, in regard to the situation where it is necessary to handle a live insertion or live withdrawal of a module. This often happens during a compelled data transfer operation using the Futurebus Plus. In this situation, there can be several problems that might occur because of the electrical capacitance of the module's bus-connector "hitting" or making connection to the live bus. The following type of problems could possibly occur:

(a) A control signal (with reference to FIGS. 1, 2 and 3) could be corrupted and confuse the protocol controller 46 in either the master module or slave module. In this case, it is quite possible that one of the modules (master or slave) can lock up and thus cause the bus to lock up.

(b) The target address could be corrupted and thus a wrong module on the bus would communicate with the master with the result that the module receiving the data is corrupted.

(c) The address could be corrupted and a wrong location on the slave module would be readout or written to and hence, the master or the slave module could be corrupted, (d) A control signal could be corrupted which would cause duplicated words or missed words of data to be transferred to the other module's memory.

(e) A data signal could be corrupted with a result that a wrong data word or words could be written into the slave modules memory.

Although each of these problems could be solved by some means, generally no one solution can solve all of these problems. In the subject invention disclosed herein, the master module uses a longitudinal redundancy error checking algorithm (LRC) to create one word for the entire address and data at the time of transmission. It then sends this LRC to the slave module during the "disconnection" phase as the final disconnection message.

The slave module then creates its own individual LRC (longitudinal redundancy error checking) word and at the end of the disconnection message will then compare the two results. Then the received LRC word is compared with the internally generated LRC word of the slave in order to make a comparison.

If the two LRC words match each other, it is then deemed that the transmission was successful.

On the other hand, if the match did not occur, the connection is terminated with an error signal. The master module (sending module) in this case, will then retransmit at a later time.

Another feature of the disclosed system is that the slave module will hold the data written to its internal memory until the LRC (longitudinal error word) is verified as a "good" transmission. Then the slave module will update its memory with this data. Otherwise, the slave module will discard the data without updating its memory and will then report "a bad transmission" to the master module. This particular operation will then save the slave's memory from being corrupted.

Figure 2:
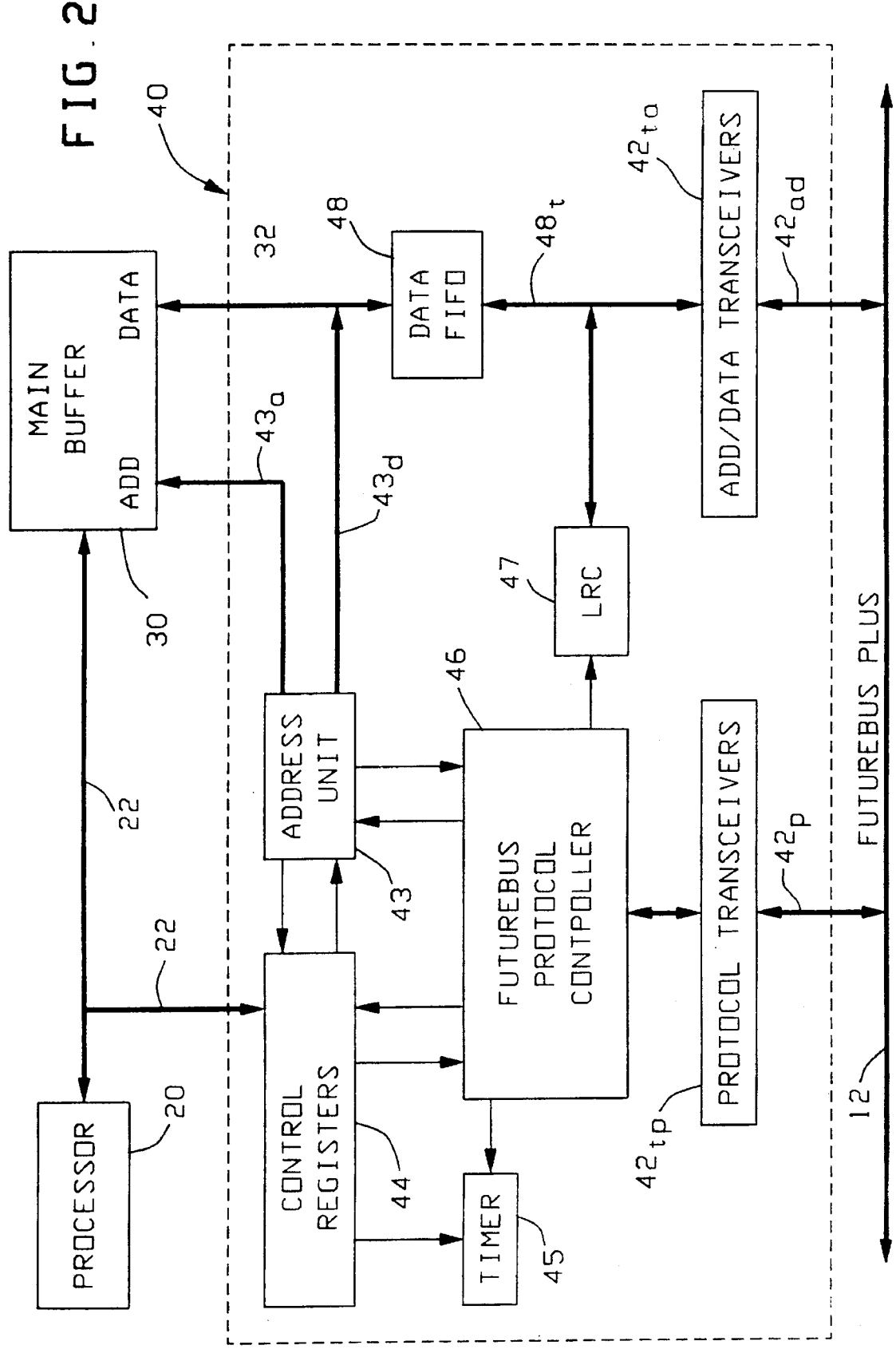
FIG. 2 is a more detailed diagram of the composition of the Futurebus interface.

FIG. 3 is a generalized system network diagram wherein various modules such as $10_a$, $10_b$, $10_c$, etc. are connected to a Futurebus 12 through connecting busses $42_a$, $42_b$, and $42_c$. Each of the modules has a processor 20, a buffer memory 30 and a Futurebus interface 40 with transceivers $42_{pt}$, $42_{ta}$ (FIG. 2).

In the operation of such a network, for example, the master module may develop an address and data to be transferred to one of the other slave modules which will receive the data and store it. During the operation of such a network, it is desirable that various slave modules may be added to or removed from the network without shutting down the use of the Futurebus Plus, 12. Thus, the present system handles the problem of obviating any data corruption while modules are being added to or removed from the Futurebus 12 without any need for shutting down or stopping the system in its data transfer operations.

DESCRIPTION OF PREFERRED EMBODIMENT

Figure 1:
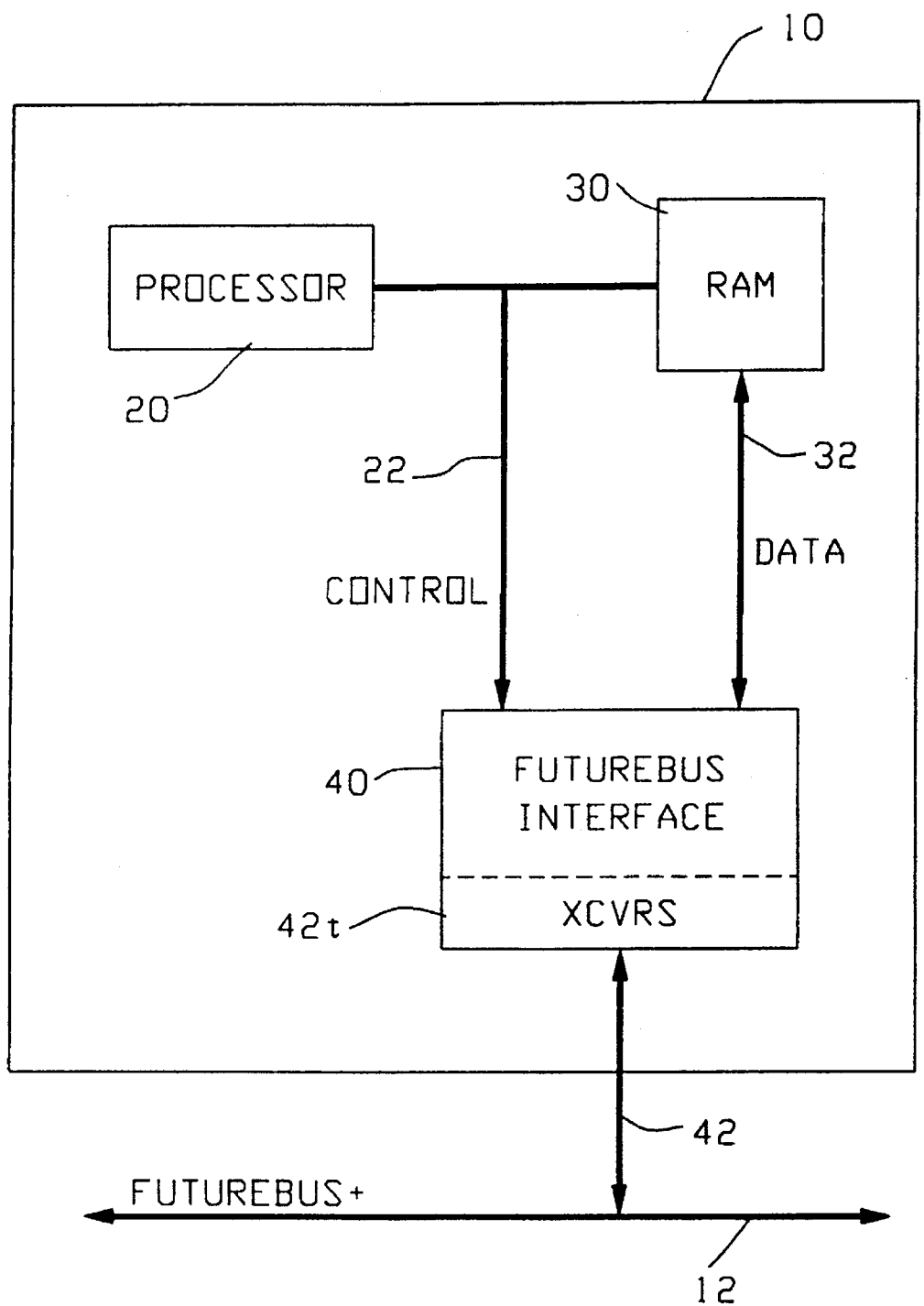
FIG. 1 is a diagram of a Futurebus Plus connected via an interface to a processor and RAM memory.

As seen in FIG. 1, the typical module 10 attached to the Futurebus Plus 12 consists of a Futurebus interface 40 which is controlled by a processor 20. Data transfers occur between a RAM buffer 30 and a Futurebus 12 by means of the Futurebus interface 40 and its transceivers $42_t$.

The Futurebus interface 40 itself is shown in more detail in FIG. 2. Here it will be seen that the processor 20 and main buffer 30 connect via a bus 22 over to the control registers unit 44. An address unit 43 connected to the control registers 44 and the Futurebus protocol controller 46 also connects on an address bus 43a to the main buffer 30 and on a data bus 43d to the main data bus 32.

The control registers unit 44 connects to a timer unit 45 and to the Futurebus protocol controller 46.

A first in/first out (FIFO) data register 48 connects via the data bus 32 to the main buffer memory 30 of the module. The data FIFO register 48 connects via bus $48_t$ to the address/data transceivers $42_{ta}$ which further connect via bus $42_{ad}$ to the Futurebus 12.

The Futurebus protocol controller 46 connects to the protocol transceivers $42_{tp}$ and thence through the bus $42_p$ onto the Futurebus Plus 12.

As seen in FIG. 2, the Futurebus interface 40 provides a longitudinal error check word generator 47 (LRC) which is connected between the Futurebus protocol controller 46 and the FIFO bus $48_t$.

Referring to FIG. 2, the main buffer memory 30 is seen to have two ports for fast access to both the processor 20 and the Futurebus 12 on a concurrent basis.

The interface 40 of FIG. 2 shows a set of control registers 44 which are used to control the Futurebus logic operations and an address unit 43 that generates the address for both the main buffer 30, for the Futurebus 12, for the Futurebus protocol controller 46, the timer 45, the data FIFO register 48, the longitudinal error check unit (LRC) 47 and the transceivers $42_{tp}$ and $42_{ta}$.

The Futurebus protocol controller 46 basically functions to translate the data on the bus 12 onto different phases of operation. These phases involve (i) the command phase; (ii) the data phase; and (iii) the disconnection phase. In each phase, the protocol controller 46 signals the proper unit to communicate to the bus 12.

A transaction is initiated by the processor 20 loading the control registers 44. A local address (LA) in the main buffer 30, signifies the source unit/and destination unit of data to be transferred in either a Write or a Read operation.

A remote address (RA) is the address in the slave module that the data transfer operation is to be performed with.

A command register 44c (CR) in the Control Register 44 (FIG. 2), holds the length-amount of data as well as information as to the type of operation (Read/Write).

After the command register, 44c (CR) is loaded, the Futurebus protocol controller 46 will perform an arbitration operation for mastership of the bus. Thus, in FIG. 3, either one of the modules 10a, 10b, 10c etc., can be chosen as the master module.

When the protocol-controller 46 in the master module gains mastership of the bus, it signals LRC unit 47 to start capturing the images (duplicates) of data that pass through the bus, 12.

The protocol controller 46 also sets up the addresses in the address unit, 43, and then starts the timer 45.

In the first phase (connect phase) of data transfer operations, the master module (10a, FIG. 3) releases the remote address (RA) on the bus while a copy (image) is captured by the master module's LRC unit 47.

At this time, all of the slave modules, 10b, 10c, will check the address to see if it is intended to match their own personal identification numbers. The selected slave's protocol controller (46) will signal its own LRC unit 47 to start capturing the data on the bus, 12.

After the slave module captures the address in its LRC unit 47, it will then signal the master module to move to the second data transfer phase which is the "data phase". The master module then reads, or writes the data it requires while at the same time all the data is captured by both the master and the slave LRC units (47) independently. Thus, the master's LRC unit 47 develops a "check word" and the slave's LRC unit 47 develops a corresponding "check word".

The master module then moves to the final phase (disconnection phase) upon completion of the data transfer to the addressed slave module. At this time the protocol controller 46 of the master module will send the collected results (check word) of its own personal LRC unit 47 over to the slave module. After this, the slave module can compare the senders LRC check word with its own LRC check word.

At this time, the slave module checks the received LRC unit from the master by sending it to its own internal LRC unit 47 and expects a zero result (match) to indicate a good data transfer. If this occurs, then the slave module ends the "disconnection phase" by then sending a "good" status signal to the master module after which the master module's protocol controller 46 writes this "good" status into the control registers 44. At this time the timer 45 is stopped.

A glitch or spike in a control line of bus 12 could cause one of the protocol controllers 46, in any one of the modules, 10a, 10b, 10c, etc., to be out of phase with other of the modules. Thus while one protocol controller 46 in one module 10, is waiting for a handshake signal, another protocol controller 46 is waiting for a different handshake signal, this condition could continue on and on thus "locking up" the use of the bus 12.

When a live insertion of a new module occurs onto the bus 12 and which may cause a data indefiniteness or confusion to the protocol controllers 46, this is called a "lock-up" condition. At this time the timer 45 will count to zero and thus cause a "time-out" condition to occur. At this stage the processor 20 is interrupted to take care of this situation, and to resolve the lockup so that bus 12 is operable.

If the address and/or data in the "connect" phase/data phase is corrupted, then it will be seen that LRC values of the master's circuit 47 and slave's LRC circuit 47 do not match.

In this case, a slave module will signal the master module during the disconnection phase by sending a "error" status to the sending module's processor 20.

A "retry" can be attempted at a later time by the master module. The slave module will hold the data received from the master module in its data FIFO 48 until the local slave internal LRC unit 47 has been verified as a good data transfer. In this case, the slave module will write the good data into its main buffer 30 and finally send a "good" status signal to the master module.

Described herein has been a network of digital modules connected by a common system bus where each module is provided with an interface unit between a processor-memory unit and system bus. Transmission of address data and message data between a master sending module and a slave receiving module is monitored by a Longitudinal Redundancy Checker (LRC) in each of the sending and receiving units which look for a match in the check-word before the receiving unit accepts the data that was transmitted. Thus any digital module that is connected to or disconnected from the system bus during live operation of the network will not corrupt the addresses and message data being transmitted on the system bus, since any errors will be detected by the LRC units in the receiving modules.

While the protective system network has been described in a preferred embodiment, it will be understood that other configurations may be implemented while still employing the concepts of the invention and still be encompassed by the following claims.

What is claimed is:

1. A system for insuring integrity of data transmission between sending and receiving digital modules in a network connecting said digital modules by a Futurebus Plus common system bus means comprising:

(a) a plurality of digital modules, connected via said Futurebus Plus common system bus means, each said digital module including:
      (a1) processor means for commanding Write operations for sending data;
      (a2) buffer memory storage means for holding data to be sent on Write operations or data received on Read operations;
      (a3) Futurebus interface means;
    (b) and wherein said Futurebus interface means includes:
      (b1) means to generate a data transfer Write operation command to send data to another digital module;
      (b2) means to receive and accept data for storage in said buffer memory storage means;
      (b3) means to generate an identification address for a receiving module;
      (b4) means to send data from said buffer memory storage means for transfer to said addressed receiving module;
      (b5) means to generate in said sending module, when sending data, a first longitudinal redundancy check (LRC) value derived from said identification address and said sending data;
      (b6) means to generate in said receiving module, when receiving data, a second LRC value, derived from said identification address and data received;
      (b7) means to compare said first and second LRC values for a match to establish validity of the received data;
    (c) said Futurebus common system bus means functioning for continuous data transfer operations while additional digital modules are being connected to or disconnected from said network.

2. The system of claim 1 which includes:

(a) means to acknowledge a valid data transfer by said receiving module from said sending module.

3. The system of claim 1 which includes:

(b) means to signal an error to said sending module when said first and second LRC values do not match.

4. In a network of digital modules which can operate as sending or receiving modules, all connected to a common Futurebus Plus system bus means for data transfer, a system for insuring integrity of data transmitted while digital modules are newly connected to, or newly disconnected from, said common Futurebus Plus system bus means, and no interruption occurs in data transmitted between sending and receiving digital modules still connected to said Futurebus Plus system bus means, said system comprising:

(a) said common Futurebus Plus system bus means connecting a plurality of digital modules;
    (b) said plurality of digital modules each including:
      (b1) a buffer memory means for holding data to be transmitted to another digital module on Write operations (OP) and for receiving verified data from another digital module on Read operations (OP);
      (b2) a processor means for initiating a Write OP to send data to another digital module or a Read OP to receive data from another digital module;
      (b3) a Futurebus Plus interface means connecting said buffer memory means and said processor means to said common Futurebus Plus system bus means, said interface means including:
        (i) means to initiate a command transmission phase for selecting the sending module;
        (ii) means to initiate a connection phase for sending the target receiving module identification address and initiate means to capture a copy of said address identification in an LRC means in said sending module;

(iii) means, in said target receiving module, for capturing a copy of said identification address, and means to signal said sending module to transmit its data to said receiving module via said Futurebus Plus system bus means;

(iv) means, in said sending module, for transmitting data to said receiving module while also making a copy of said data in said LRC means in said sending module;

(v) means in said sending module to combine said identification address and said transmitted data to form a first LRC check word;

(vi) means, in said receiving module, to combine said identification address and said transmitted data to form a second LRC check word;

(vii) means, in said receiving module, for receiving said first LRC check word in a separate transmission after said transmitted data and verifying the match of said first and second LRC check words before placing the said data into said receiving module's buffer memory means.

5. In a Futurebus Plus system bus means connecting a plurality of digital modules which can operate as Sending or Receiving modules wherein each digital module has a specific identification address, a system for insuring integrity of data transfer without interruption to data transfer operations even when digital modules are being disconnected from, or being connected to, said Futurebus Plus system bus means, said system comprising:

(a) a plurality of digital modules connected to said Futurebus Plus system bus means, each said digital module including:

(a1) a processor means for initiating Write-send or Read-receive operations;

(a2) buffer memory means for holding data to be sent to another digital module or to be received from another digital module;

(a3) A Futurebus Plus interface means including:

(i) means to initiate an address phase to target a receiving module including making a copy of the identification address of said receiving module for placement in a longitudinal redundancy check unit of said sending module;

(ii) means to initiate a data phase to transmit data to said receiving module including making a copy of said data transmitted for placement in said longitudinal redundancy check unit of said sending module;

(iii) means to initiate a disconnection phase wherein said sending module develops a first check word from the address and data sent, and said receiving module develops a second check word of the address and data received, including:

(iiia) means to match said first and second check words to verify transmission integrity;

(iv) means to place said received data, when verified, into said buffer memory means.

6. An integrity method for data transfers between sending and receiving modules commonly connected to a Futurebus Plus system bus means wherein each sending and receiving module has a processor, a buffer memory and a Futurebus interface unit having a Longitudinal Redundancy Check (LRC) unit and a transaction timer unit connected to said Futurebus Plus system bus means, said method comprising the steps of:

(a) establishing a send command with a target address of the receiving module and the address of data in the sending module buffer memory to be transferred;

(b) accessing said Futurebus Plus system bus means by the sending module Futurebus interface unit;

(c) initiating said sending module's LRC unit to copy the target address and data to be sent by forming a first check word;

(d) transmitting said target address in a first transmission phase to access said target receiving module;

(e) transmitting said data in a second transmission phase to said target receiving module;

(f) initiating said receiving module LRC unit to copy the target address and data received to form a second check word;

(g) comparing said first check word and second check word for a match before releasing said data for storage in said receiving module's buffer memory;

(h) establishing timing limits for the transmission-reception cycle to prevent any system bus lock-up condition from continuing.

* * * * *